United States Patent [19]
Nakagaki et al.

[11] Patent Number: 4,684,985
[45] Date of Patent: Aug. 4, 1987

[54] SIGNAL CONVERTING METHOD AND CIRCUIT FOR TELEVISION RECEIVER

[75] Inventors: Nobuhumi Nakagaki; Toshinori Murata; Toshiyuki Kurita, all of Yokohama, Japan

[73] Assignee: Hitachi, Ltd., Tokyo, Japan

[21] Appl. No.: 751,267

[22] Filed: Jul. 2, 1985

[30] Foreign Application Priority Data

Jul. 23, 1984 [JP] Japan ................. 59-151220

[51] Int. Cl.$^4$ .............................. H04N 7/01
[52] U.S. Cl. .................................... 358/140
[58] Field of Search .............. 358/140, 11, 160, 21 R, 358/166

[56] References Cited
U.S. PATENT DOCUMENTS 4,426,661 1/1984 Okada et al. ................. 358/140
4,480,267 10/1984 Van der Avoort et al. ....... 358/140

FOREIGN PATENT DOCUMENTS

53-79421 7/1978 Japan .
0079379 5/1983 Japan .
59-40772 3/1984 Japan .

Primary Examiner—James J. Groody
Assistant Examiner—Victor R. Kostak
Attorney, Agent, or Firm—Fay, Sharpe, Beall, Fagan, Minnich & McKee

[57] ABSTRACT

A signal converting circuit is disclosed for converting a television signal for 2:1 interlaced scanning system to another television signal for 1:1 non-interlaced scanning system using line memories for storing image data of two adjacent scanning lines of a present field and field memories for storing image data of a last occurring field. An interpolation signal is produced by controlling a value of the televisions signal of the two adjacent scanning lines in response to the television signal of the two adjacent scanning lines in the present field and the television signal of a scanning line positioned between the two adjacent scanning lines in the last occurring field.

21 Claims, 19 Drawing Figures

W: WHITE  B: BLACK

Fig. 10

SIGNAL CONVERTING METHOD AND CIRCUIT FOR TELEVISION RECEIVER

BACKGROUND OF THE INVENTION

The present invention relates to a signal converting method and circuit for a television signal, particularly to a scanning line converting method for a high resolutional television receiver and a circuit thereof.

In recent years, television receivers have been developed to a point that a high-resolutional image can be reproduced. Advanced techniques were being developed through research for replacing analog video signal circuits with digital signal circuits. Accompanying the replacement, techniques to process the television signal of the present system into a higher quality level have been proposed. The impairment of the picture quality of the television signal in the present system is caused mainly by interlaced scanning which is usually called 2:1 interlaced scanning and characterized by the following problems:

(1) Line flicker is generated around boundaries of lateral stripes pattern of the image;

(2) Structure of the scanning lines (since the number of scanning lines in each field may be as low 262.5 lines, becomes more significant for larger frames and details in the frames are blurred; and (3) The currently available system fails to provide any improvement in overall resolution; a comb-filter is used to improve horizontal resolution, but vertical resolution is not improved at all.

To solve the problems described above, that is, to improve image quality, a system for doubling the number of the scanning lines by using line memories has been developed and is known as the 1:1 non-interlaced scanning with line interpolation system. There are two types of such system, that is, a same line interpolation and an average line interpolation, as will be described later. The average line interpolation system is described, for example, in Japanese Patent Application Laid-Open No. 79378/83. These systems can strike out the structure of the scanning lines in the frames. However, the systems have problems such that line flicker is emphasized rather than diminished or that resolution in the vertical direction is degraded on some video signal patterns.

SUMMARY OF THE INVENTION

It is an object of the present invention to provide a signal converting method and circuit for a television receiver.

It is another object to provide a method and circuit for converting a television signal of 2:1 interlaced scanning into a television signal of 1:1 non-interlaced scanning with scanning line interpolation.

It is another object to provide a method and circuit for scanning line interpolation to prevent line flicker and to improve vertical resolution.

To attain the above objects in the present invention, image data like a television signal of a previous field is used to control scanning line interpolation of image data for two adjacent scanning lines in a current or present field. Namely, in the present invention, a signal converting circuit is constructed with line memories for storing image data of two adjacent scanning lines of the present field, field memories for storing image data of the previous field, and means for differentiating image data of the two adjacent scanning lines and image data of the previous field and for determining a line interpolation signal of the two adjacent scanning lines in the present field. Specifically, in the present invention, in order to interpolate the two adjacent scanning lines in the present field, image data in the previous field corresponding to a line, for which the interpolation signal is determined, is used. That is, an interpolation coefficient is determined by subtracting an average signal of image data of two adjacent scanning lines in the present field and image data in the previous field corresponding to the position of the line interpolation signal.

Further, in the present invention, image data having an analog form or a digital form, especially, a color television signal is separated into a brightness, or luminance component and a color difference component and the luminance component is subjected to the scanning line interpolation with image data of the previous field and the present field, whereas the color difference component is subjected to the scanning line interpolation with image data of the present field, because the line flicker is based mainly on the luminance component.

DETAILED DESCRIPTION

Figure 1:
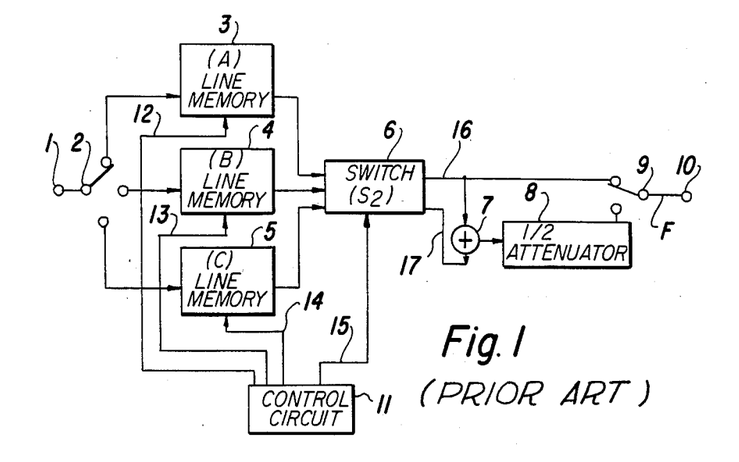
FIG. 1 shows a block diagram of a signal converting circuit in the prior art.
Figure 2A:
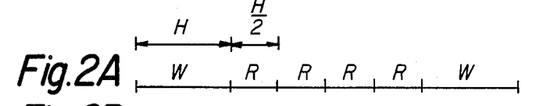
FIGS. 2A to 2F illustrate time charts for explaining the operation of the circuit shown in FIG. 1.
Figure 2B:
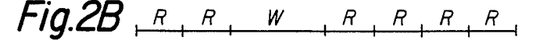
Figure 2C:
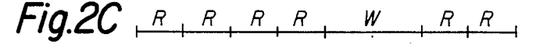
Figure 2D:
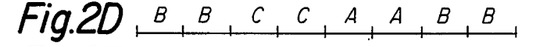

FIG. 1 is a block diagram showing the fundamental concept of the prior art. Reference numeral 1 indicates an input terminal; numeral 2 a switch; numerals 3, 4 and 5, line memories of 1H, where H indicates a horizontal period; numeral 6 a switch; numeral 7 an adder; numeral 8 a half attenuator; numeral 9 a switch; numeral 10 an output terminal; numeral 11 a line memory control circuit; and numerals 12, 13 and 14 read/write (R/W) control signals. The operations of the example of the prior art will now be described. Assume that one (e.g., an R signal) of demodulated color RGB signals is supplied to the input terminal 1. If the line memories 3, 4 and 5 are designated at A, B and C, they operate at such times, respectively, as are illustrated in FIGS. 2A, 2B and 2C. When the A-line memory 3 is in a write period (W), the B- and C-line memories 4 and 5 are in read periods (R). Moreover, the reading from each line memory is conducted twice for the 1H period, as shown in FIGS. 2A to 2C because it is executed at a double rate.

Figures 2E, 2F:
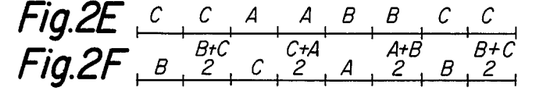

This R/W control is in response to the R/W control signals 12, 13 and 14 provided from the line memory control circuit 11. First of all, when the demodulated color signal is supplied to the input terminal 1, switch 2 is connected for each successive 1H period with the three line memories 3, 4 and 5 so that the signal for each line is stored into each line memory for different write periods. When the writing ends, the operation is shifted to the read period so that the reading is repeated two times for each ½H period. The signal as read is supplied to the switch 6 so that the image data of the line memories is provided in response to a switching signal 15 supplied from control circuit 11 at times shown in FIGS. 2E and 2F. The output signals designated by numerals 16 and 17 from the switch are averaged by the adder 7 and the half attenuator 8, and are supplied to switch 9. This switch 9 is switched for each ½H period so that the original signal and the line interpolation signal alternately occur at terminal 10, as shown in FIG. 2F. As a result, a signal converted to a double scanning rate is provided. By fixing switch 9 at the upper side, terminal 10 provides the signal train of FIG. 2F which is interpolated by the double repetitions of the scanning lines.

Figure 3A:
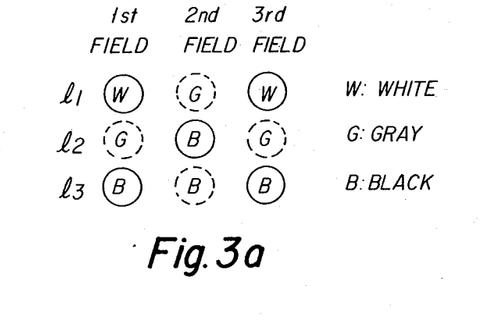
FIGS. 3a and 3b illustrate explanatory patterns for showing the scanning line interpolation according to the circuit shown in FIG. 1.
Figure 3B:
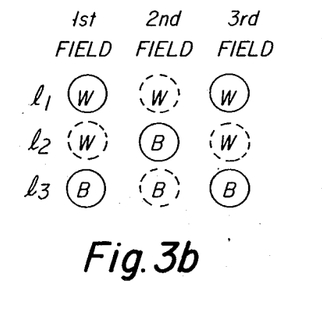

Here, since an NTSC television signal is subjected to 2:1 interlaced scanning, the scanning lines of previous and subsequent fields appear alternately in the positions of the newly interpolated scanning lines. Therefore, the system described above has its image quality degraded rather than improved, because of the absence of the image data from the previous field. This degradation will be described with reference to FIGS. 3a and 3b. Characters $l_1$, $l_2$ and $l_3$ indicate scanning lines in specified positions, and FIGS. 3a and 3b show picture elements or pixels when scanning is executed in the vertical direction of the Figure and when the fields progress from left to right. Solid circles indicate the real picture elements whereas broken circles indicate the picture elements which have been newly produced by scanning line interpolation. The average line interpolation system is shown in FIG. 3a, and the same line interpolation system is shown in FIG. 3b. The scanning line $l_1$ is assumed to be white whereas the scanning lines $l_2$ and $l_3$ are assumed to be black; the brightness of image is also assumed to vary between the scanning lines $l_1$ and $l_2$.

In the case the FIG. 3a, in the first field, the scanning line $l_2$ is an average of the scanning lines $l_1$ and $l_3$ so that it takes on a grey hue. A similar interpolation is conducted in the second and third fields. In scanning line $l_1$ in this case, the white and gray hues are alternately repeated for each field so that line flicker is decreased. This decrease also occurs for scanning line $l_2$. This system has an advantage that line flicker is made smaller than the case where scanning lines are not interpolated, because interpolations in this average line interpolation system are made with a neutral hue such as grey. In the average line interpolation system, however, the boundaries are blurred by the grey hue so that vertical resolution becomes worse.

Next, in the case of FIG. 3b, in the first field, scanning line $l_2$ of the first field is the same interpolation of the scanning line $l_1$ so that it appears white. The scanning line $l_1$ of the second field is the same as the previous scanning line which is not shown, so that it take on a white hue, whereas the scanning line $l_3$ is caused to take on black hue by repeatedly interpolating the scanning line $l_2$. The scanning line $l_2$ of the third field takes on a white hue like the first field. If the white and black hues of scanning line $l_2$ are repeated for each field, 30 Hz line flicker occurs. The same line interpolation system emphasizes the line flickers more than a system not using any interpolation system.

Figure 4:
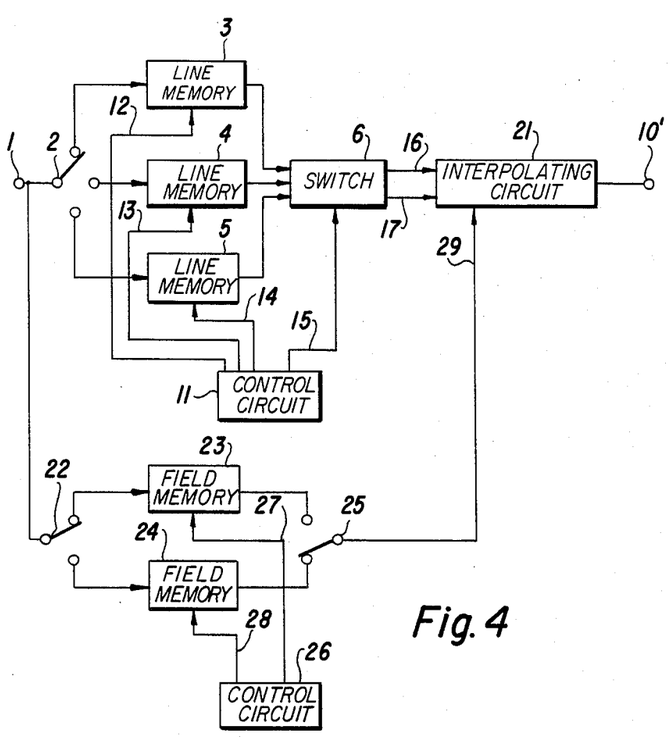
FIG. 4 shows a block diagram of a luminance signal component converting circuit of the present invention.

Next, the present invention will be described in the following in connection with one embodiment with reference to FIG. 4. Reference numeral 21 indicates an interpolating circuit; numeral 22 a switch; numeral 23 a first field memory; numeral 24 a second field memory ($F_2$); numeral 24 a switch; numeral 26 a field memory control circuit; numerals 27 and 28 field memory R/W switching signals; and numeral 29 a field memory output image signal. The same elements shown in FIG. 1 are indicated with the same reference numerals. The operations of the embodiment of the present invention will be described in the following paragraphs. Referring to FIG. 4, the operations of switch 2, line memories 3, 4 and 5, switch 6, and line memory control circuit 11 are the same as those of the example discussed earlier herein and shown in FIG. 1, so that their descriptions are omitted.

Figure 5A:
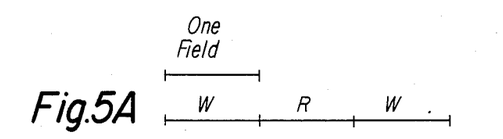
FIGS. 5a and 5b illustrate time charts for explaining the operation of the circuit shown in FIG. 4.
Figure 5B:
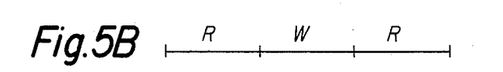

First, the brightness signal will be described. When the luminance signal is supplied to the input terminal 1, line memories 3, 4 and 5 execute the operations described above. Only one of the field memories 23 and 24 is selected by switch 22 so that the field memory selected is written with the image of one field. When the image data has been written on one field memory, the scanning lines are read during a single vertical scanning period two-by-two at double the rate for a subsequent single field. Switch 25 is connected with one of the field memories 23 and 24 in the reading operation to send the image data to the interpolating circuit 21. The field memories 23 and 24 operate at the times shown in FIGS. 5a and 5b in response to the R/W switching signals 27 and 28 output from the field memory control circuit 25. While one of the field memories is writing, the other is reading so that the switch 25 continuously provides image data delayed by one field, which is denoted by the numeral 29. The switches 22 and 25 are also switched for each field so that they are always connected with one of the field memories. On the other hand, field memories ($F_1$) 23 and ($F_2$) 24 would require vast memory capacities if they stored all the signals of one field. However, the data of the field memories are used only for judgment, not as interpolated signals, as will be described. Therefore, it is possible in the present invention to reduce the memory capacities of the field memories. The objects of the present invention can be achieved if the number of the total picture elements, that is, the precision of each picture element written into the field memories, are reduced by between one-third and one-fourth.

Figure 6:
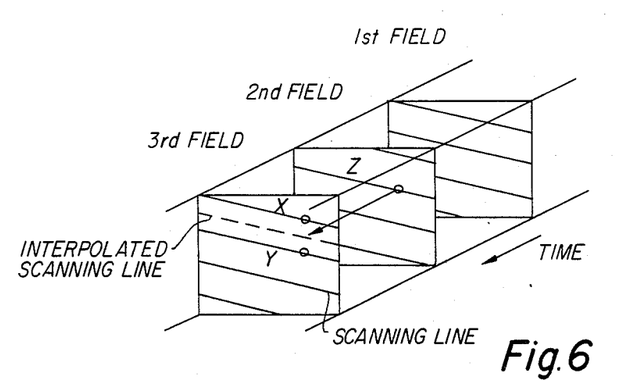
FIG. 6 is an explanatory view for explaining the scanning line interpolation of the present invention.

The output signals 16 and 17, that is, image data of the present field, are supplied to the interpolating circuit 21, together with the output signal 29 occurring at switch 25, that is, the image data of the preceding field. Relationship of these output signals is illustrated in FIG. 6, where image data of three continuous fields and scanning lines are shown. Referring to FIG. 6, X indicates a scanning line corresponding to image data 16, Y indicates a scanning line corresponding to image data 17 and Z indicates a scanning line corresponding to line information contained in the image data 29. The interpolating circuit 21 generates the line interpolation signal by varying a mixing ratio between image data 16 and image data 17 in response to the output signal 29 and provides a luminance signal converted to have high quality, to output terminal 10'.

Figure 7:
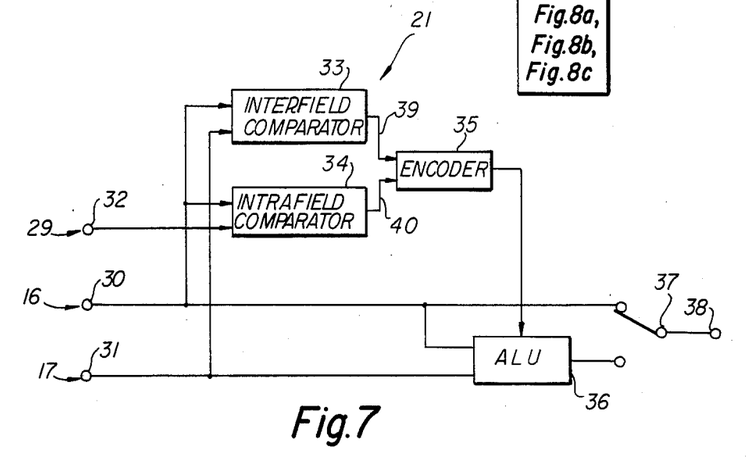
FIG. 7 shows a block diagram of an embodiment of an interpolating circuit 21 shown in FIG. 4.

Next, operations of the interpolating circuit 21 will be described with reference to FIGS. 6 and 7. FIG. 7 shows the construction of the interpolating circuit 21 of FIG. 4. Numerals 30, 31 and 32 denote input terminals receiving the output signals 16, 17 and 29, respectively. Numerals 33 and 34 designate an intrafield scanning line comparator and an interfield scanning line comparator, respectively. Numerals 35, 36, 37 and 38 indicate an encoder, an arithmetic logic circuit (ALU), a switch (S₆) and an output terminal connected with the output terminal 10'. In FIG. 6, a dotted line appearing in the third field indicates the interpolated scanning line which is produced by the interpolating circuit 21.

When scanning line X of the third field is applied to the input terminal 30, scanning line Y is supplied to the input terminal 31 and scanning line Z of the second field is applied to terminal 32, intrafield scanning line comparator 33 compares the luminance signals of scanning lines X and Y to provide a correlation coefficient $\alpha$ as an output signal 39. Likewise, interfield scanning line comparator 34 compares the luminance signals of the scanning lines X and Z to provide a correlation coefficient $\beta$ as an output signal 40. Encoder 35 produces an arithmetic switching signal in accordance with the magnitude of the correlation coefficients $\alpha$ and $\beta$ to send the switching signal to ALU 36. In response to the arithmetic switching signal, ALU 36 switches and averages scanning lines X and Y. The interpolated scanning line signal is applied to the switch 37, which is alternately switched between the original scanning line so that the interpolated scanning line signal is converted into a signal having twice as many scanning lines and is supplied to the terminal 38. This converted signal is supplied as a final output to the terminal 10'.

Figure 8A:
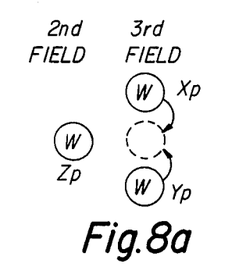
FIGS. 8a and 8c illustrate explanatory patterns for explaining the scanning line interpolation according to the present invention.
Figure 8B:
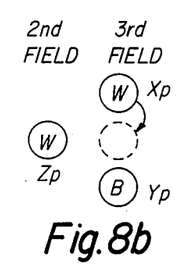
Figure 8C:
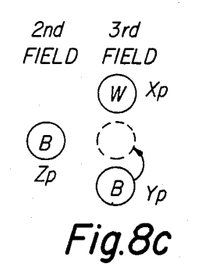

Next, a method of scanning line interpolation will be described with reference to FIGS. 8a, 8b and 8c, which show how to interpolate between arbitrary picture elements of scanning lines X, Y and Z of FIG. 6. When correlation coefficients $\alpha$ and $\beta$ are produced from the arbitrary picture elements $X_p$, $Y_p$ and $Z_p$ of scanning lines X, Y and Z the case of: (a) $\alpha$=large and $\beta$=large; (b) $\alpha$=small and $\beta$=large; and (c) $\alpha$=small and $\beta$=small, as shown in FIGS. 8a, 8b and 8c are examples of possible combinations. First, where (a) $\alpha$=large and $\beta$=large, correlation among the picture elements $X_p$, $Y_p$ and $Z_p$ is high, therefore, an average is interpolated between the picture elements $X_p$ and $Y_p$. Referring now to FIG. 8b, when (b) $\alpha$=small and $\beta$=large, correlation between picture elements $X_p$ and $Y_p$ is low whereas the correlation between picture element $X_p$ and $Z_p$ is high. This indicates that the interfield correlation between picture elements $X_p$ and $Z_p$ is high. Therefore, picture element $X_p$ is interpolated as being between picture element $X_p$ and $Y_p$. Referring to FIG. 8c, when (c) $\alpha$=small and $\beta$=small, this indicates that there is neither correlation between the picture elements $X_p$ and $Y_p$, nor between picture elements $X_p$ and $Z_p$. This indicates that correlation between the picture elements $Y_p$ and $Z_p$ is high. Therefore, the picture element $Y_p$ is interpolated between the picture elements X and $Y_p$. Thus, by repeating these interpolations while taking the intrafield and interfield correlations for each picture elements, it becomes possible to produce a luminance signal which is converted to have twice as many scanning lines and a higher quality of resolution.

Next, the color difference signal will be described in the following. For the color difference signal, only the averaging method of the prior art can achieve the interpolations while considering that the visual characteristics of an observer are inferior to that of the luminance signal. Therefore, it is possible to omit the field memory for the color difference signal. When the color difference signal is input to the input terminal 1, as shown in FIG. 4, scanning line interpolations are conducted by the line memories, as has been described herein, so that a color difference signal having twice the number of scanning lines occurs at terminal 10.

Figure 9:
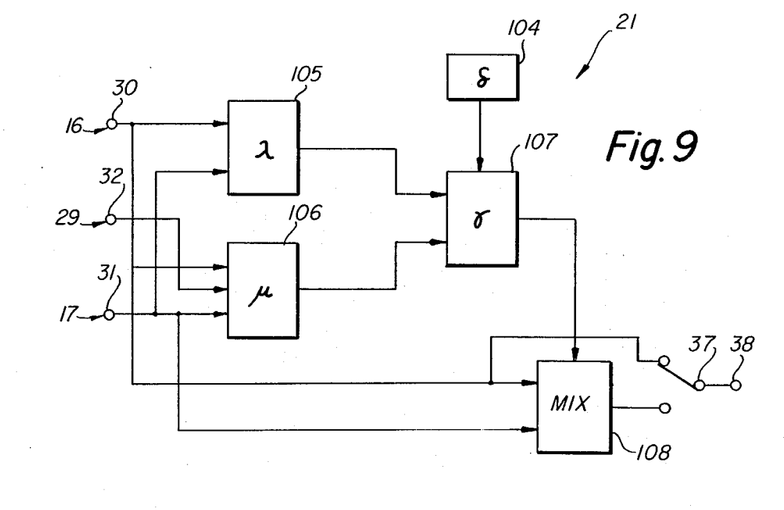
FIG. 9 shows a block diagram of another embodiment of the interpolating circuit 21 shown in FIG. 4.

Further, another embodiment of the interpolating circuit 21 of the present invention will be described in connection with FIGS. 9 and 10. This embodiment interpolates the luminance signals of the scanning lines X, Y and Z. In the following description, scanning lines X, Y and Z indicate the luminance signals corresponding to each line. FIG. 9 illustrates a block diagram of interpolating circuit 21 shown in FIG. 4. Numerals 30, 31, 32, 37 and 38 indicate the same parts as shown in FIG. 7. When the scanning lines X and Y are supplied to circuit 105, for example, a subtracting circuit, circuit 105 provides an output signal $\lambda$, that is, (X−Y). When the scanning lines X, Y and Z are applied to a circuit 106, which includes a subtracting circuit and an averaging circuit, circuit 106 provides an output signal, that is, (X+Y)/2−Z. These signals $\lambda$ and $\mu$ are supplied to circuit 107 for providing an interpolation coefficient $\gamma$.

Interpolation coefficient circuit 107, comprising a dividing circuit, provides interpolation coefficient $\gamma$, equal to $(\frac{1}{2}+\mu/\lambda)$. Here, the fraction $\mu/\lambda$ expresses nomalization of the output signal of the interfield comparison by output signal $\lambda$ of the intrafield comparison. When $\mu/\lambda$ is larger, that is, nearer to $\frac{1}{2}$, interpolation coefficient $\gamma$ approaches 1, which shows that there is large correlation between the scanning line Z, and the scanning line Y. In contrast, when $\mu/\lambda$ is smaller, that is, near to $(-\frac{1}{2})$, the interpolation coefficient approaches zero, which indicates that the correlation between the scanning line X and the scanning line Z is small. Further, when $\mu/\lambda$ becomes nearer to zero, interpolation coefficient approaches $\frac{1}{2}$, which indicates that the correlation between the scanning line X and the scanning line Y is large.

However, when the absolute value of the output signal is either not larger than a noise threshold value $\delta$, which is generated by a circuit 104 for setting up a noise threshold value, or not smaller than $(|\lambda|/2+\delta)$, the interpolation coefficient is set to $\frac{1}{2}$. Namely, in the case that $|\lambda| \leq \delta$, the difference between scanning line X and scanning line Y is just below the noise threshold. Therefore, the interpolation coefficient is set to $\frac{1}{2}$. In the case that $|\mu|/2+\delta$, there will be considered the following two cases.

$$Z+\beta \leq X \text{ or } Z+\delta \leq Y \qquad (i)$$

$$Z-\beta \geq X \text{ or } Z-\delta \geq Y \qquad (ii)$$

In the case of (i), the value of adding the noise threshold to scanning line Z is smaller than the smaller one of scanning lines X and scanning line Y; that is, this indicates that it is impossible to correlate the image data of the present field and the line information of the preceding field. Also, the same situation may happen in a case where an object has a luminence signal extremely different from the luminance signal of its surrounding. Therefore, the interpolation coefficient is set to ½, where the resolution may become a little inferior. In the case of (ii), the value of subtracting the noise threshold δ from scanning line Z is larger than the larger one of the scanning lines X and Y, so that interpolation coefficient γ is also set to ½.

Next, a mixer 108 produces the interporated lines in response to the inteporlation coefficient in the following formula.

$$I = [1-\gamma] \cdot X + \gamma \cdot Y$$

where I indicates a line interpolation signal. When the interpolation coefficient γ is near to zero, the correlation between the scanning line X and the scanning line Z is large, so that the line interpolation signal I tends to be predominantly determined by the value of scanning line X. When the interpolation coefficient γ is near to one, the correlation between the scanning line Z and scanning line Y, so that the value of line interpolation signal I is predominantly determined by the value of scanning line Y. Further, when interpolation coefficient γ is near to ½, the correlation between scanning line X and scanning line Y is large, line interpolation signal I is set to have an averge of scanning lines X and Y. Line interpolation signal I produced as described above is switched every ½ H period by the switch 37 and provided to terminal 38 as the luminance signal having a high quality.

Figure 10:
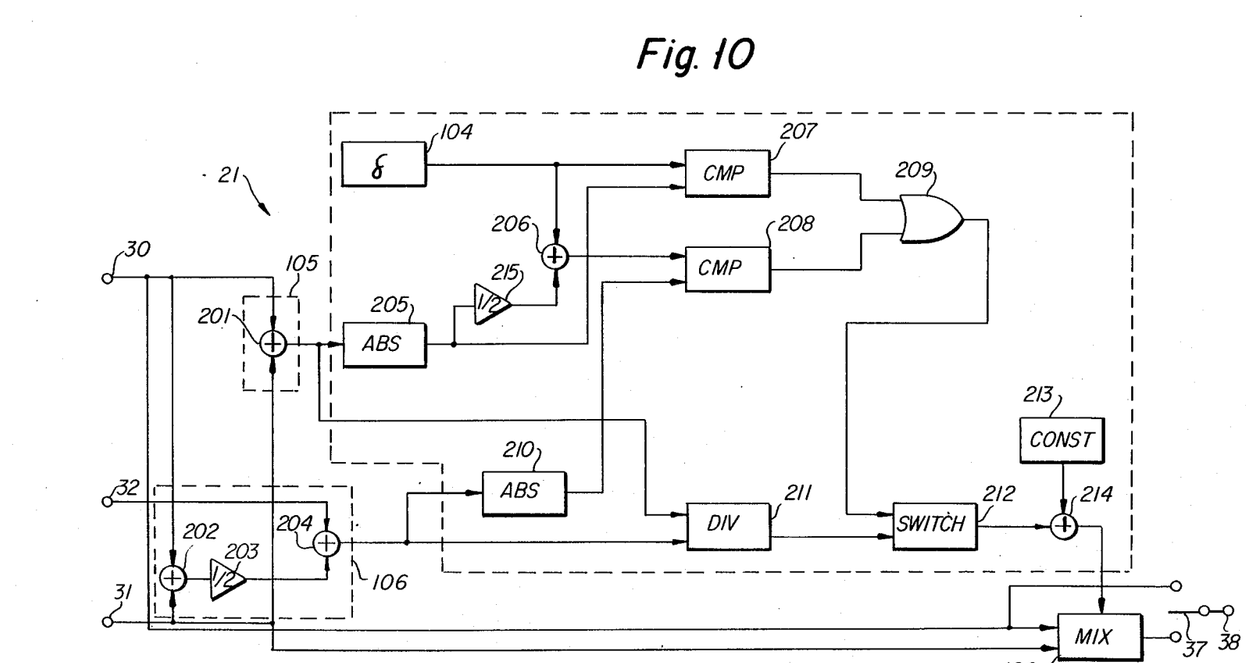
FIG. 10 shows a circuit diagram of another embodiment of the interpolating circuit 21 shown in FIG. 4.

FIG. 10 shows a more detailed circuit for interpolating circuit 21. Numerals 201, 202, 204, 206 and 214 indicate adders, numerals 203 and 215 denote half multipliers, numerals 205 and 210 designate absolute circuits, numerals 207 and 208 indicate comparators, numeral 209 denotes an OR circuit, numeral 111 designates a divider, numeral 212 indicates a switch and numeral 213 denotes a constant setting circuit, respectively. The parts having the same numerals as shown in FIG. 4 show the same elements.

First, scanning lines X, Y and Z are provided to each input terminal. Adder 201 provides an output signal (X−Y), adder 202 an output signal (X+Y) and half multiplier 203 an output signal (X+Y)/2. Adder 204 delivers μ, equal to [(X+Y)/2−Z]. The absolute circuit 205 outputs the absolute value |λ|, equal to |X−Y|, and absolute circuit 210 provides |μ|, which is equal to |(X+Y)/2−Z|. Output signal |λ| is multiplied by ½ in half multiplier 215, and added with the constant δ by the adder 206, the output signal of which is (|λ|/2+δ). Comparator 20, compares the absolute value |λ| with the noise threshold value δ, provides one in case of δ ≧ |λ| or zero in case of δ < |λ|.

Comparator 208 compares the absolute value |μ| with the output signal of the adder 206, provides an output of one in case of |λ| ≧ (|μ|/2+δ) or zero in case of |λ| < (|μ|/2+δ). OR circuit 209 provides the output signals from the comparator 207 and 208. The divider 211 provides the signals μ/λ and comprises a ROM. It is possible to construct the divider 211 by using a register and an adder. The switch 212 attains an "ON" state and provides output signal μ/λ when the output signal of the OR circuit 209 is zero. Further, the switch 212 attains a "ONE" state and provides a zero output when the output signal of the OR circuit 209 is one. The constant setting circuit 213 provides a constant ½. Adder 214 adds the signals μ/λ and the constant ½ and provides output signal γ equal to (μ/λ+½). Mixer 108 provides output signal I, as mentioned before, in response to signal γ. Therefore, line interpolation signal I and the original scanning signal are switched every ½ H period and supplied to terminal 109 as a luminance signal having twice of the number of the scanning lines.

As mentioned above, in the present invention, line flicker is prevented, so that it is possible to improve vertical resolution. Further, by separating the television signal into a luminance signal and a color difference signal, the luminance signal is subjected to scanning line interpolation with field memories, whereas the color difference signal may be subjected to the scanning line interpolation with line memories. Therefore, it becomes possible to economically attain the high-quality signal converting circuit of the color television signal.

We claim:

1. A method for converting a television signal having a plurality of scanning lines during each scanning field, comprising the steps of:
   storing the television signal corresponding to at least two adjacent scanning lines of a present field,
   storing the television signal corresponding to at last occurring field,
   producing a line interpolation signal in the present field corresponding to a scanning line between said two adjacent scanning lines, in dependence upon the television signal corresponding to said two adjacent scanning lines of the presnt field and a television signal in said last occurring field corresponding to said scanning line between said two adjacent scanning lines of the present field.

2. A method according to claim 1, wherein:
   said step of producing said line interpolation signal comprises making a first subtracted signal from the television signal corresponding to the first occurring line of said two adjacent scanning lines and the television signal corresponding to the next occurring line of said two adjacent scanning lines, and making a first average signal from the television signal corresponding to said first occurring line and the television signal corresponding to said next occurring line.

3. A method according to claim 1, wherein:
   said step of producing said line interpolation signal comprises making a first subtracted signal from the television signal corresponding to the first occurring line of said two adjacent scanning lines and the television signal corresponding to the next occurring line of said two adjacent scanning lines, making a first average signal between the television signal corresponding to said first occurring line and the television signal corresponding to said next occurring line, and making a second subtracted signal from said first average signal and the television signal corresponding to said scanning line from said two adjacent scanning lines of the last occurring field.

4. A method according to claim 3, wherein said step of producing said line interpolation signal further comprises making a control signal having a value determined by the ratio of said second subtracted signal to said first subtracted signal.

5. A method according to claim 4, wherein said step of producing said line interpolation signal further comprises mixing the television signal corresponding to said first occurring line and the television signal corresponding to said second occurring line in response to said control signal.

6. A method for converting a first type television signal for a 2:1 interlaced scanning system having a plurality of scanning lines during each scanning field, to a second type television signal for a 1:1 non-interlaced scanning system, comprising the steps of:

storing a first type television signal of the most recent field, providing a first type television signal corresponding to two adjacent scanning lines of a present field, and processing the first type television signal corresponding to said two adjacent scanning lines of the present field and a first type television signal of the most recent field corresponding to a scanning line positioned between said two adjacent scanning lines, to make a line interpolation signal for a second type television signal between the first type television signal corresponding to the first occurring line of said two adjacent scanning lines of the present field and the first type television signal corresponding to the second occurring line of said two adjacent scanning lines of the present field.

7. A method according to claim 6, wherein said processing step comprises producing an interpolation coefficient in response to the signal corresponding to said two adjacent scanning lines of the present field and the signal in the most recent field corresponding to said scanning lines positioned between said two adjacent scanning lines and generating said line interpolation signal in response to said interpolation coefficient.

8. A method according to claim 7, wherein said step of producing said interpolation coefficient comprises making a first subtracted signal from the signal corresponding to said first occurring line and the signal corresponding to said second occurring line, making an average signal from the signal corresponding to said first occurring line and the signal corresponding to said second occurring line, and making a second subtracted signal from said average signal and the signal corresponding to said scanning line in the most recent field positioned between said two adjacent scanning lines.

9. A method according to claim 8, wherein said step of producing said interpolation coefficient further comprises making said interpolation coefficient in dependence upon the value of the ratio of said second subtracted signal to said first subtracted signal.

10. A method according to claim 6, wherein said processing step comprises mixing the signal corresponding to said first occurring line and the signal corresponding to said second occurring line in response to said interpolation coefficient, to make said line interpolation signal.

11. A method according to claim 6, wherein the first type television signals are luminance signals.

12. A circuit for converting a television signal having a plurality of scanning lines during each scanning field, comprising:

means for storing the television signal corresponding to two adjacent scanning lines of a present field, means for storing the television signal corresponding to a most recent field, means for producing a line interpolation signal corresponding to a scanning line occurring between said two adjacent scanning lines in dependence upon the television signal corresponding to said two adjacent scanning lines of said present field and a television signal in said most recent field corresponding to said scanning line between said two adjacent scanning lines in said present field.

13. A circuit according to claim 12, wherein said producing means comprises means for generating an interpolation coefficient in response to a relation between the television signal corresponding to said two adjacent scanning lines of said present field and the television signal in said most recent field corresponding to a central scanning line occurring between said two adjacent scanning lines; and means for interpolating the television signal of said two adjacent scanning lines of said present field in response to said interpolation coefficient.

14. A circuit according to claim 12, wherein said producing means comprises means for controlling a value of the television signal of the first occurring line of said two adjacent scanning lines by a value of the television signal of the next occurring line of said two adjacent scanning lines, and means for alternately switching the television signal of said first occurring line and an output signal of said controlling means every one-half horizontal period.

15. A circuit according to claim 13, wherein said interpolating means comprises means for controlling a value of the television signal of said first occurring line by the value of the television signal of said next occurring line, and means for alternately switching the television signal of said first occurring line and an output signal of said controlling means every one-half horizontal period.

16. A circuit for converting a first type television signal for 2:1 interlaced scanning system having a plurality of scanning lines during each scanning field to a second type television signal for 1:1 non-interlaced scanning system, comprising:

means for storing a first type television signal corresponding to two adjacent scanning lines of a present field, and a first type television signal corresponding to a most recent field;

means for generating an interpolation coefficient in dependence upon the first type television signal corresponding to said two adjacent scanning lines of said present field and a first type television signal in said most recent field corresponding to a scanning line occurring between said two adjacent scanning lines; and means for interpolating the first type television signal of said two adjacent scanning lines of said present field in dependence upon said interpolation coefficient.

17. A circuit according to claim 16, wherein said storing means comprises three line memories and two field memories.

18. A circuit according to claim 16, wherein said generating means comprises means for making a first subtracted signal from the first type television signal corresponding to a first occurring line of said two adjacent scanning lines and the first type television signal corresponding to a second occurring line of said two adjacent scanning lines, means for making an average signal from the signal corresponding to said first occurring line and the signal corresponding to said second occurring line, means for making a second subtracted signal from said average signal and the signal corresponding to said scanning line occurring between said two adjacent scanning lines of said most recent field, and means for making an output signal having a value corresponding to the ratio between said second subtracted signal to said first subtracted signal.

19. A circuit according to claim 18, wherein said generating means further comprises means for adding a constant to said output signal, to produce said interpolation coefficient $\gamma$.

20. A circuit according to claim 19, wherein said interpolating means comprises means for producing a summation signal from the signal corresponding to said second occurring line multiplied by said interpolation coefficient $\gamma$ and the signal corresponding to said first occurring line multiplied by $(1-\gamma)$.

21. A circuit according to claim 20, wherein said interpolating means further comprises means for alternately switching the signal of said first occurring line and said summation signal every one-half horizontal period.

* * * * *